United States Patent [19]

Jordan

[11] Patent Number: 5,713,454
[45] Date of Patent: Feb. 3, 1998

[54] METHOD AND APPARATUS FOR TRANSFERRING NONORIENTED MASCARA APPLICATIONS

[75] Inventor: Melvin P. Jordan, Rayham, Mass.

[73] Assignee: Risdon Corporation, Naugatuck, Conn.

[21] Appl. No.: 490,225

[22] Filed: Jun. 14, 1995

[51] Int. Cl.$^6$ ................................................ B65G 47/24
[52] U.S. Cl. ........................ 198/391; 198/396; 198/624
[58] Field of Search .................................. 198/379, 396, 198/391, 443, 614, 612, 624, 803.8, 400, 399

[56] References Cited

U.S. PATENT DOCUMENTS

| | | | |
|---|---|---|---|
| 3,258,106 | 6/1966 | Booth | 198/396 X |
| 3,655,027 | 4/1972 | Douglas et al. | 198/396 X |
| 4,236,302 | 12/1980 | Kuehling | 198/391 X |
| 4,401,203 | 8/1983 | McDonald et al. | 198/396 X |
| 4,462,508 | 7/1984 | Grafius | 198/396 X |
| 5,062,522 | 11/1991 | Sagawa et al. | 198/624 X |

Primary Examiner—D. Glenn Dayoan
Attorney, Agent, or Firm—St. Onge Steward Johnston & Reens

[57] ABSTRACT

A method and apparatus are shown for transferring, storing, sorting and orienting nonoriented mascara applicators, each applicator having a stem and a brush. The apparatus includes a bowl having a spiraled ramp positioned along the inner wall for transporting the applicators along the ramp from the bottom of the bowl to the top of the bowl. The applicators are then transferred to an accumulator wheel which includes: two sides and a circumferential edge therebetween and a slot formed in the circumferential edge, the slot having a first and a second side and a width therebetween. The width of at least one portion of the slot is approximately equal to the diameter of the brush. The slot tapers to form a stabilizing portion; the stabilizing portion has a width approximately equal to the diameter of the stem. Advantageously, either end of the mascara applicator can be removably housed in the wheel. The apparatus also includes an orienting device comprising a shuttle having a main compartment and a receiving slot on one end thereof and a stem slot on the opposite end thereof. Advantageously, an applicator may be transferred into the shuttle in either a brush-end first or a stem end first position. Due to the arrangement of the slots, the applicators are disposed over a transfer tube in a brush-end first position.

19 Claims, 6 Drawing Sheets

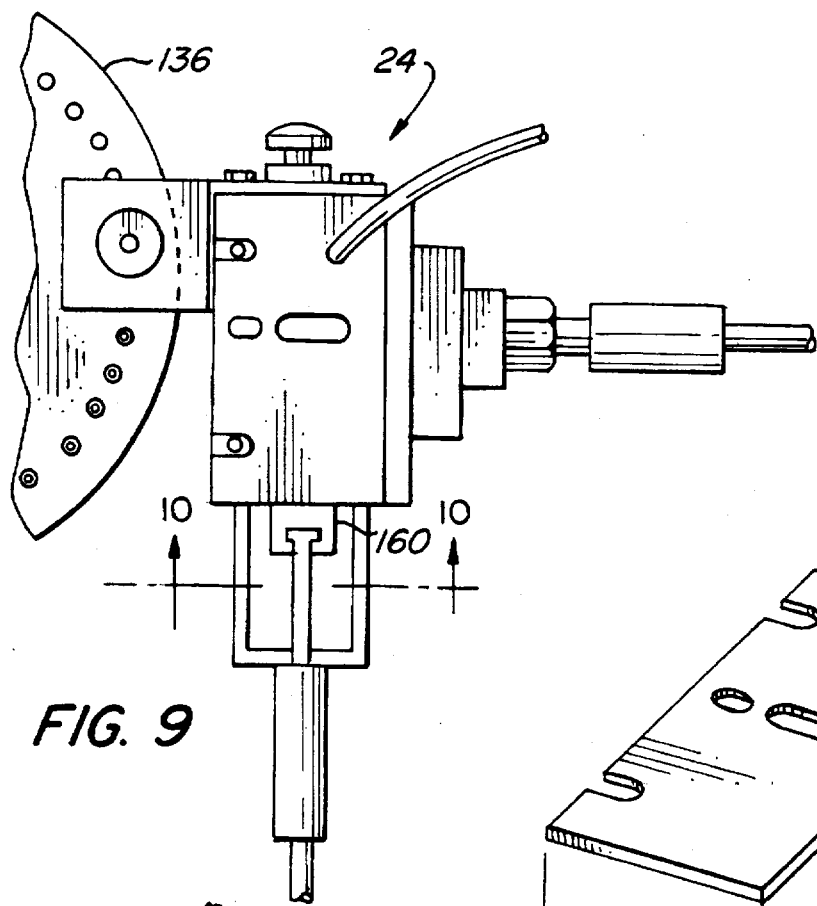
FIG. 9
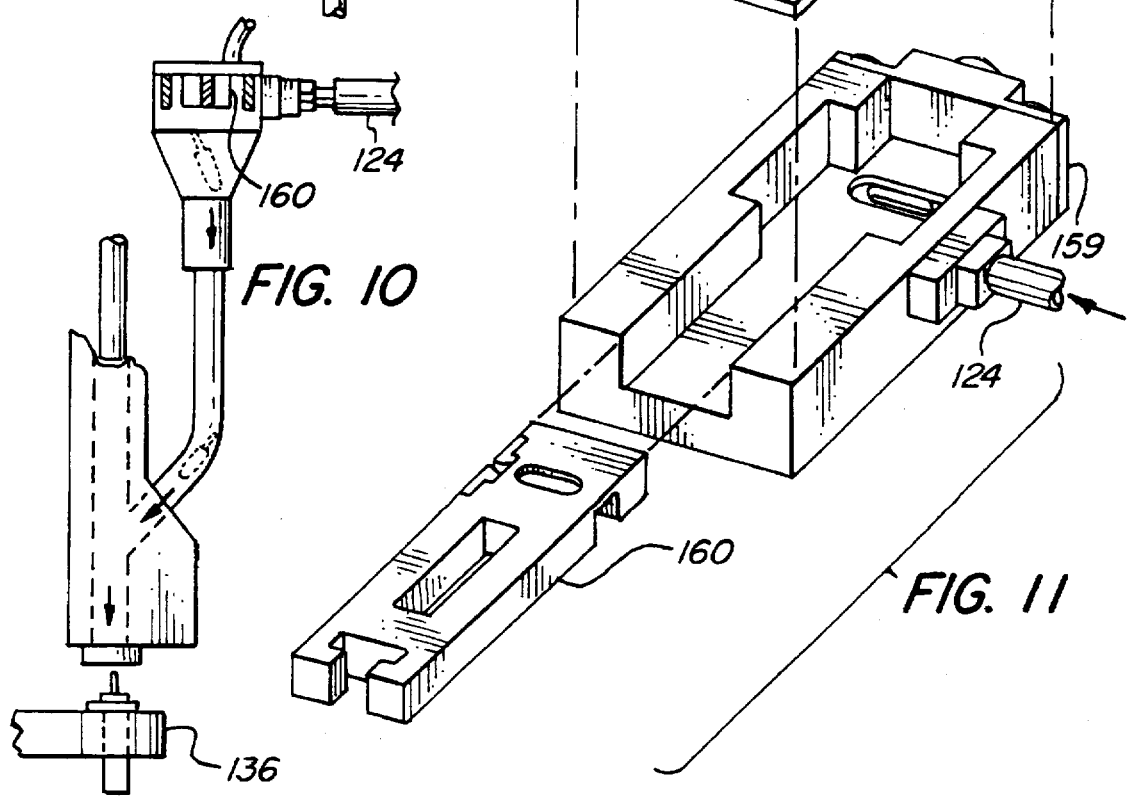
FIG. 10
FIG. 11

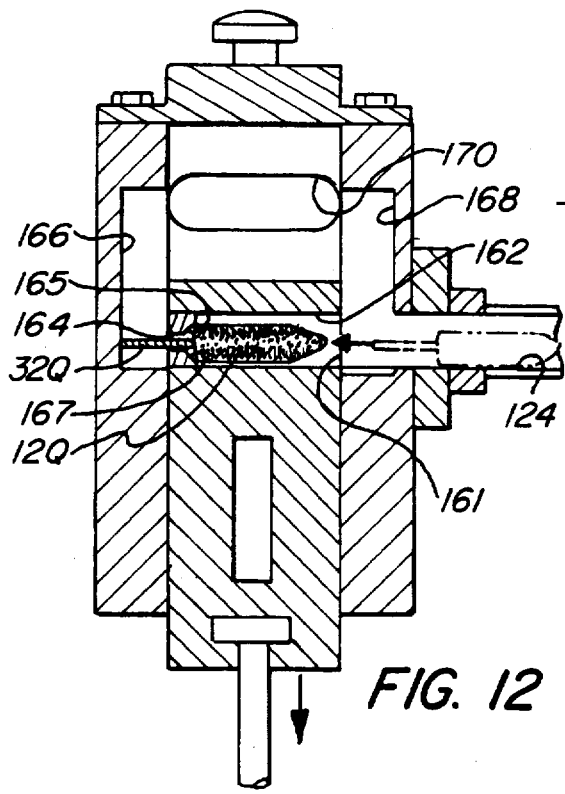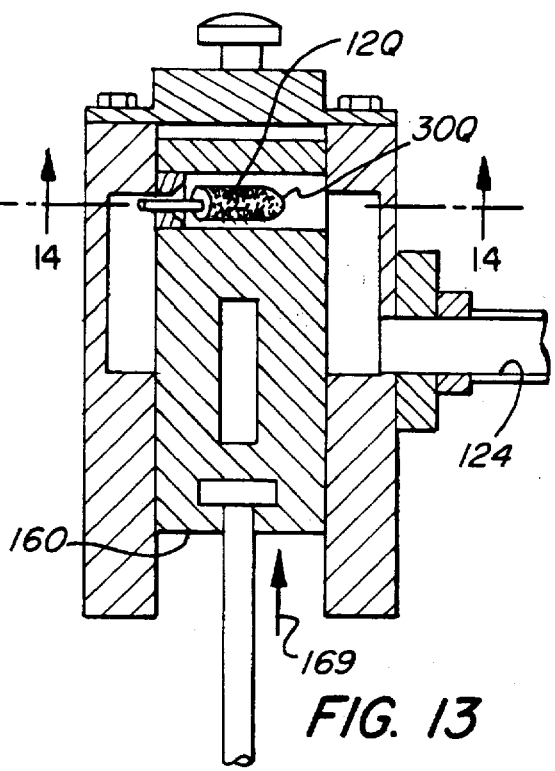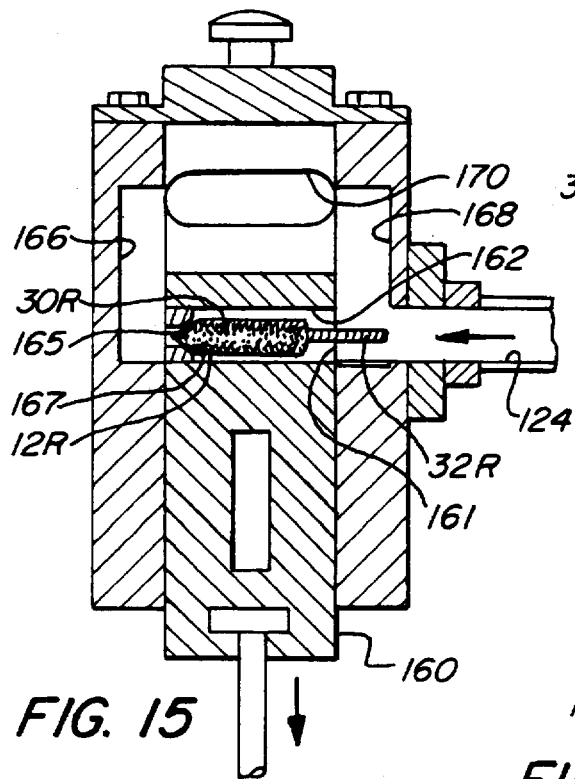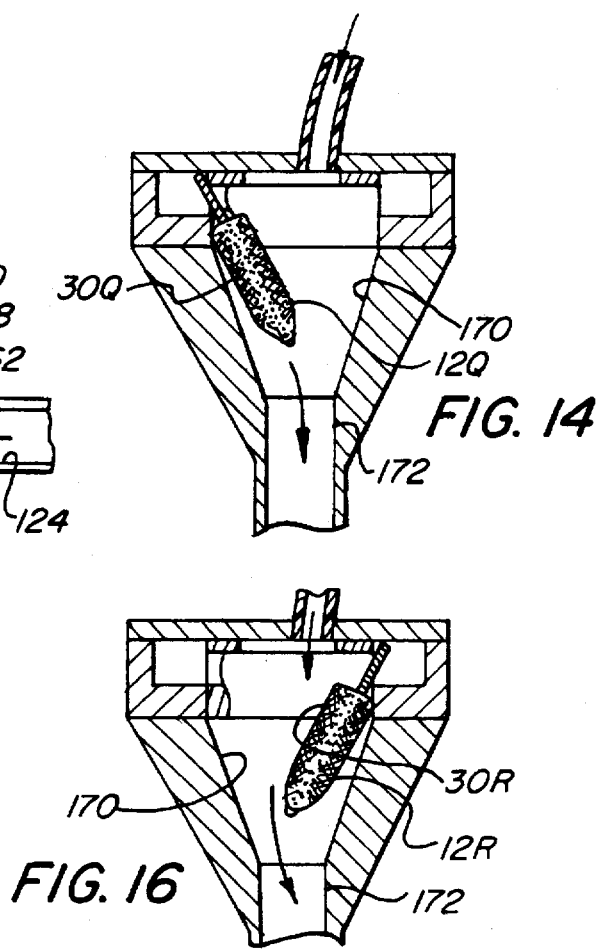

METHOD AND APPARATUS FOR TRANSFERRING NONORIENTED MASCARA APPLICATIONS

FIELD OF THE INVENTION

The present invention relates to a method and apparatus for transferring nonoriented items along an assembly line, and more particularly, for transporting, separating, sorting, storing and orienting mascara applicators.

BACKGROUND OF THE INVENTION

Methods and machines used to transport mascara applicators, sometimes referred to generally as mascara brushes, along an assembly line are known. Unfortunately, these known methods and machines are labor intensive, requiring several laborers to oversee, correct and facilitate the process of moving the mascara applicators along the assembly line. For example, the brush ends of the mascara applicators frequently get entangled and a laborer is required to separate the applicators for proper placement along the line.

Further, many methods require early orientation of the applicators in the assembly line so that each applicator is in proper placement for housing in a mascara insert. An applicator that is improperly oriented, i.e., stem-end first, rather than bristle-end first, can disrupt the process. Also, applicators which become improperly oriented during transport along the line (due to vibrations or the like) may cause the assembly line to automatically stop, causing undesirable down-time, and forcing a laborer to correct the orientation of the applicator and restart the process.

In addition, most machines or methods require exact placement of the applicators throughout the entire process. Consequently, timing is critical in order to maintain the required distance, or gap, therebetween. If an applicator is not properly positioned for transporting between two points the timing can be disrupted, causing the assembly process to come to a halt, and again requiring the intervention of and correction by a laborer.

Conventional machines or methods have an additional drawback in that they are sometimes incapable of separating, transporting and orienting mascara applicators that have different stem lengths or different filament sizes. Substitution of a first stem length for a second stem length requires adjustments to various equipment pieces and changes in timing elements.

What is desired, therefore, is an apparatus and method for transferring nonoriented mascara applicators which is less labor intensive than conventional mascara applicator assembly line processes for transferring mascara applicators, operates with less undesirable down-time, is less sensitive to the orientation of the applicators and the distance between the applicators, untangles the mascara applicators for proper alignment in an assembly line without human intervention, and orients and transfers applicators of different stem lengths and filament sizes with minimal adjustments to the equipment pieces or timing elements.

SUMMARY OF THE INVENTION

Accordingly, it is an object of the present invention to provide a method and apparatus for transferring mascara applicators that is less labor intensive than conventional methods or apparatus associated therewith.

It is another object of the present invention to provide a method and apparatus for transferring mascara applicators that has less down time than conventional methods and apparatus associated therewith.

It is still a further object of the present invention to provide a method and apparatus for transferring mascara applicators which is less sensitive to the spacing between the applicators.

It is yet another object of the present invention to provide a method and apparatus for transferring applicators that are tangled together, and a method and apparatus for untangling them, without the need of a laborer.

It is yet a further object of the present invention to provide a method and apparatus for transferring mascara applicators, wherein the method is virtually independent of applicator orientation until substantially the end of the assembly line.

It is still a further object of the present invention to provide a method and apparatus for transferring mascara applicators which does not require adjustments to equipment sizes or timing elements when applicators having different stem lengths or filament sizes are used.

To overcome the deficiencies of the prior art and to achieve the objects and advantages listed above, a machine and method are disclosed which comprise: a bowl for receiving a plurality of mascara applicators, the bowl having a top and a bottom and an inner wall extending therebetween, and a ramp spirally positioned along the inner wall of the bowl; means for rotating and vibrating the bowl so as to separate and transport each applicator along the ramp from the bottom of the bowl to the top of the bowl; means for transferring the mascara applicators from the bowl to an accumulator wheel; and means for orienting the applicators.

Advantageously, the ramp comprises a layer of material on its upper surface to facilitate transporting each applicator. Any material may be used which has a sufficiently high coefficient of friction such that each applicator maintains its position along the ramp while the bowl is vibrated.

As noted, at least one and preferably a plurality of applicators are transferred from the bowl to an accumulator wheel. The accumulator wheel comprises two sides and a circumferential edge therebetween and a slot formed in the circumferential edge. The slot has a first and a second side, and a width therebetween. Advantageously, the width of the slot is approximately the diameter of the brush section of the applicator. The slot of the wheel tapers to form a stabilizing portion which has a width approximately the diameter of the stem of the applicator. As such, either a portion of the stem or a portion of the brush section can be removably housed in the stabilizing portion.

At least one tab is attached to or formed from a side of the slot and extends inwardly into the slot and engages a portion of the applicator. Advantageously, the width of the slot at the location of the tab is less than the diameter of the brush of the applicator and, as a result, serves to stabilize the applicator while it is housed in the slot. Therefore, either the first end or the second end of the applicator can be removably housed in the slot of the wheel.

The accumulator wheel offers at least three advantages over the prior art. First, the slot extends, preferably, entirely about the circumferential edge of the wheel. Consequently, there is no specific defined location or locations for the insertion of the mascara applicators; they may be inserted anywhere in the slot, and the mascara applicators may be inserted into the slot in regularly or irregularly spaced intervals. Thus, timing is less critical than in the prior art since predetermined spacing between applicators need not be maintained. Second, the wheel accepts and can sufficiently house mascara applicators which are oriented in either direction: stem-end first or brush-end first. Thus, the complicated step of orienting the mascara applicators can be delayed for a later work station. Third, depending on the diameter of the wheel, it can effectively house up to about thirty (30) or more mascara applicators. This design can effectively process many more mascara applicators than prior art machines, which are generally very limited.

The invention and its particular features and advantages will become more apparent from the following detailed description when considered with reference to the accompanying drawings.

BRIEF DESCRIPTION OF THE DRAWINGS

FIG. 9 is a top view of the orienting machine shown in FIG. 1;

FIG. 10 is a side view in partial cross section of the orienting machine taken along line 10—10 of FIG. 9;

FIG. 11 is a isometric view of the orienting machine;

FIGS. 12–14 are cross sectional views of the orienting machine showing the operation of the device when an applicator enters stem-end first; and FIGS. 15–16 are cross sectional views of the orienting machine showing the operation of the device when an applicator enters brush-end first.

DETAILED DESCRIPTION OF THE DRAWINGS

Figure 1:
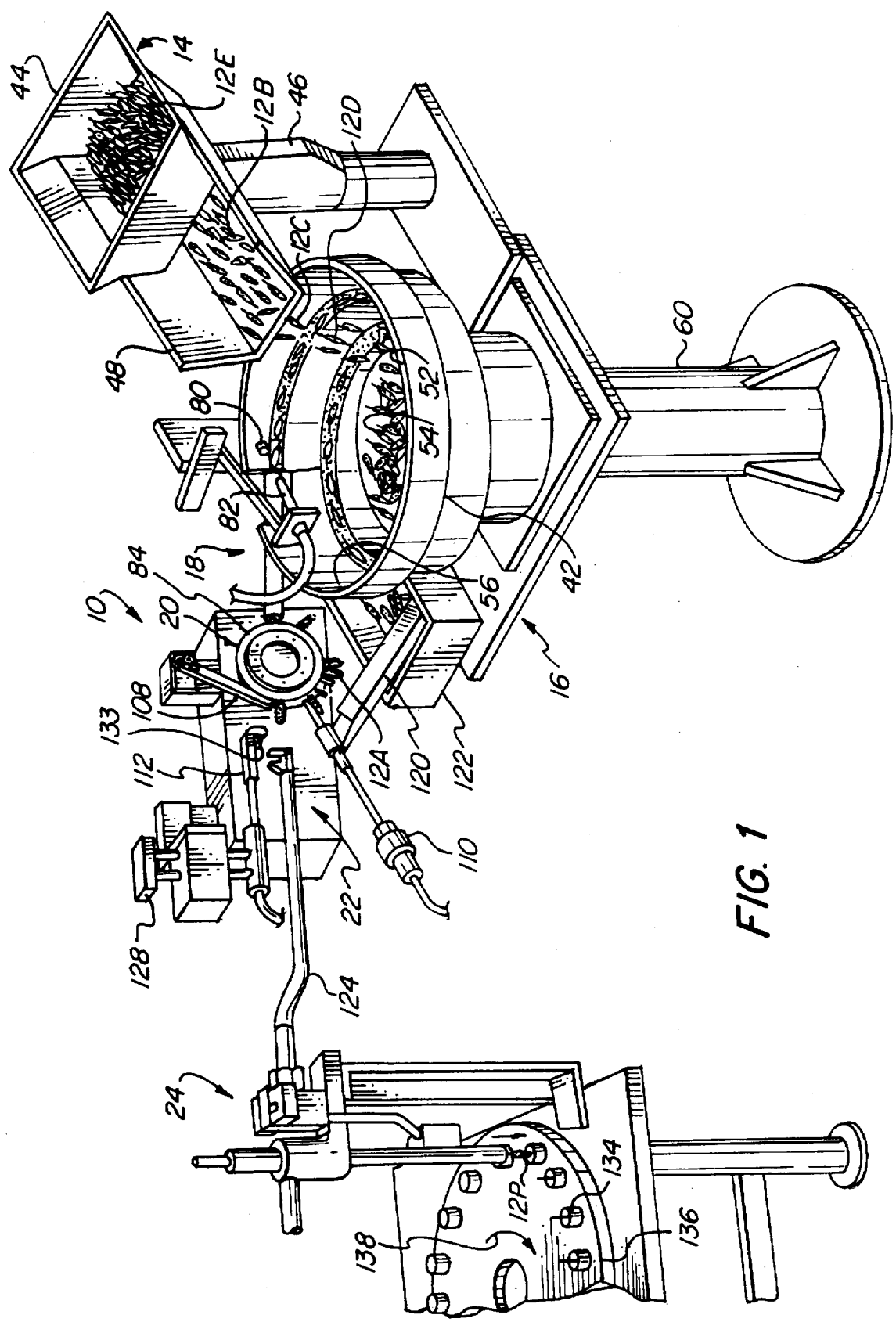
FIG. 1 is an isometric view of an apparatus for transferring nonoriented mascara applicators constructed in accordance with the present invention.

Referring to the drawings in detail, a machine and method for transferring, storing, sorting and orienting nonoriented articles, such as mascara applicators, is shown and generally designated by the reference numeral 10. It should be noted that for the sake of clarity not all the components and parts of machine 10 may be shown and/or marked in all the drawings. As used in this description, the terms "up", "down", "top", "bottom", etc. refer to machine 10 when in the orientation illustrated in FIG. 1.

It should also be understood that the invention has been described for use with mascara applicators, such as 12A (FIG. 8), for the sake of convenience only. Other articles may be sorted, separated, transported and oriented by the same machine 10. Further, it should be understood that different articles may not require each step shown in the invention. That is, one may dissect the invention and use, for example, just the storing feature of machine 10, without incorporating any of the other features of the invention.

Machine 10, in its preferred embodiment, comprises a feeder 14, a sorter 16, a transferring mechanism 18, a storing device 20, a removing mechanism 22, and an orienting device 24. See FIG. 1.

Figure 8:
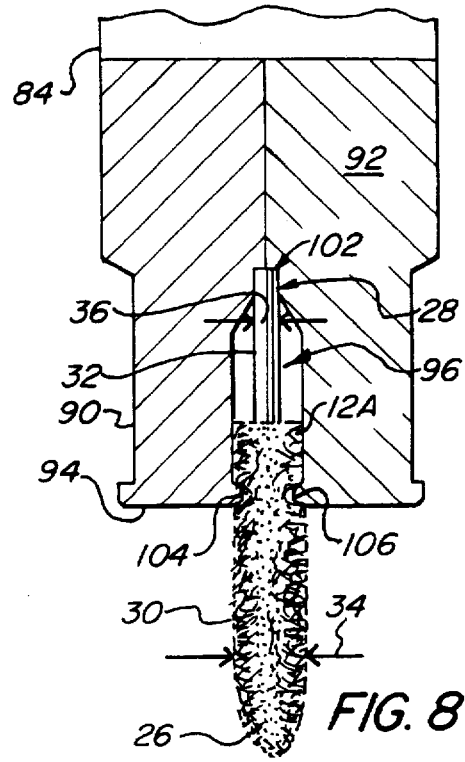
FIG. 8 is a is a cross-sectional view of a mascara applicator housed in the accumulator wheel, taken along line 8—8 of FIG. 6, the applicator disposed in stem-end first position.

Mascara applicator 12A, best shown in FIG. 8, comprises a first end 26 and a second end 28. First end 26 comprises brush 30 having a predetermined diameter 34; second end 28 comprises stem 32, which has a predetermined diameter 36. Diameter 36 of stem 32 is less than diameter 34 of brush 30. Brush diameter 34 is measured at substantially the widest point of brush 30. Stem diameter 36 is measured at substantially the widest point of stem 32.

It should be understood that all mascara applicators 12A, 12B, 12C, 12D, 12E, 12F, 12G, 12H, 12I, 12J, 12K, 12L, 12M, 12N, 12P, 12Q, 12R described herein are identical. Different reference characters have been used to denote a different location in the process.

Referring to FIG. 1, feeding mechanism 14 feeds at least one applicator 12B, and preferably a plurality of applicators 12B, 12C, 12D, 12E into bowl 42. Any suitable feeding mechanism may be used so as to provide a steady stream of applicators 12B, 12C, 12D, 12E into bowl 42. Most preferably, feeding mechanism 14 comprises an upper tier housing 44 which houses a plurality of applicators 12E which are received from a source (not shown), such as a floor operator. Upper tier 44 is operably connected to a motor (not shown) through a shaft 46 so as to cause upper tier 44 to vibrate so as to move applicators, such as 12E through a hole (not shown) in the floor of upper tier 44 and into a lower tier 48. Lower tier 48 is operably connected through shaft 46 to a motor and vibrated so as to move applicator 12E from lower tier 48 to bowl 42.

Any suitable means known in the art can be used to vibrate tiers 44, 48 including mechanical, electrical, hydraulic, and magnetic means or a combination thereof. It should be understood that applicators 12B, 12C, 12D, 12E may also be transported, instead of by vibrational movement, by any suitable method known in the art, such as by an endless loop conveyor (not shown). Alternatively, bowl 42 may be loaded with a plurality of applicators manually by a floor operator (not shown).

Figure 2:
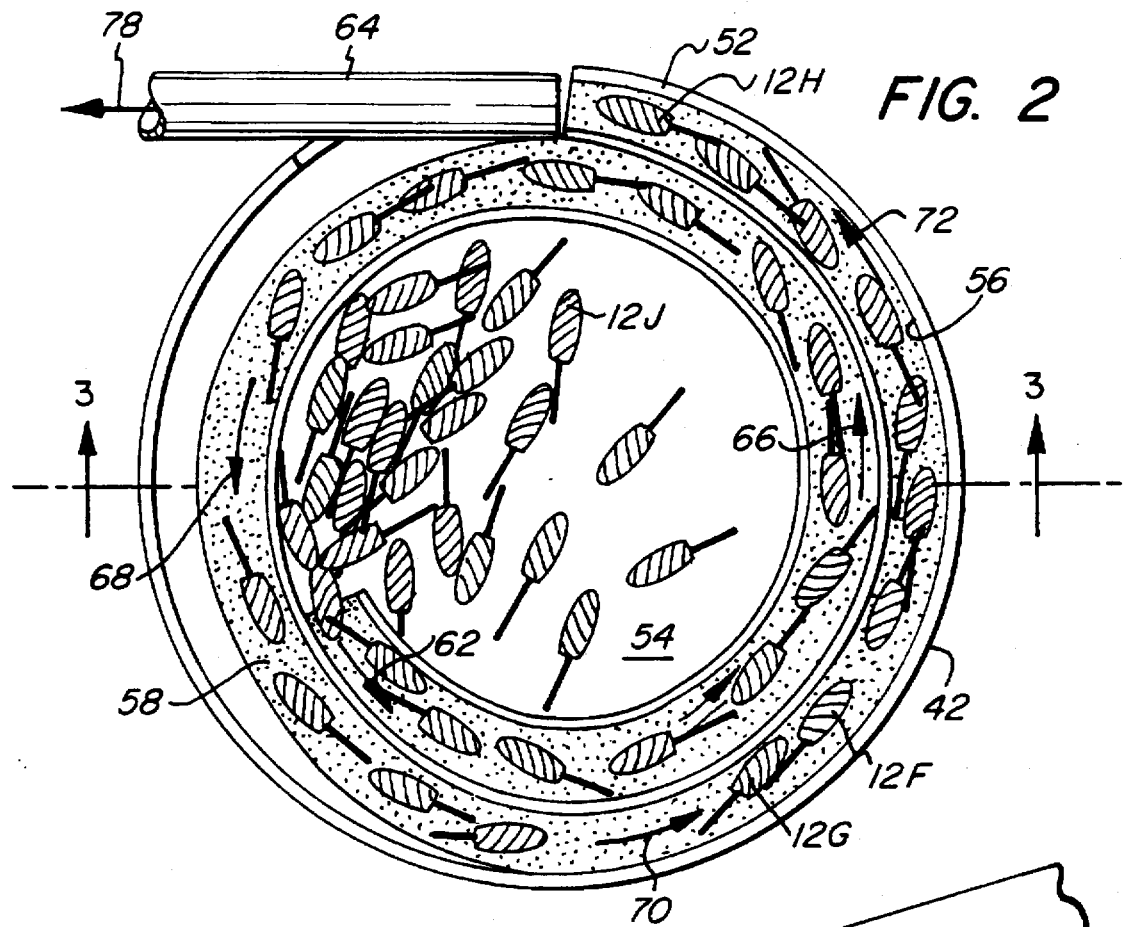
FIG. 2 is a top plan view of a bowl for housing a plurality of mascara applicators shown in FIG. 1, showing a plurality of mascara applicators moving along a spiraled ramp positioned along an inner wall of the bowl, with a feeder removed for clarity.

Feeding mechanism 14 feeds a plurality of applicators 12B, 12C, 12D, 12E into a sorting mechanism 16. Sorting mechanism 16 comprises vibrating bowl 42. As shown in FIGS. 1, 2, bowl 42 has a top 52 and a bottom 54, and an inner wall 56 extending therebetween. Bowl 42 further comprises a spiraled ramp 58 (best shown in FIGS. 2, 3) positioned along inner wall 56 so as to transport at least one mascara applicator, such as 12F, 12G, (FIG. 2) along ramp 58 from substantially the bottom 54 of bowl 42 to substantially the top 52 (FIGS. 1, 2). Any suitable bowl may be used such as that one made and manufactured by Hopper Feeds Automation, Inc., located in Rayham, Mass. 02767.

Bowl 42 is, preferably, supported by shaft 60 (FIG. 1) and operably connected through shaft 60 to a motor (not shown) to be continuously vibrated sufficiently so as to untangle applicators 12B, 12C, 12D, 12E after they have been fed into bowl 42 to move applicators from the bottom 54 of bowl 42 to ramp 58. Any suitable means known in the art can be used to vibrate bowl 42 including mechanical, electrical, hydraulic, and magnetic means, or a combination thereof. Bowl 42 is preferably vibrated from about fifty to about seventy times per second, and most preferably from about fifty-seven to about sixty-three times per second.

Bowl 42 is rotationally driven by a motor (not shown) along a rotational path in the direction indicated by arrow 62 (FIG. 2). Bowl 42 and ramp 58 rotate so as to spirally transport applicators 12F, 12G, 12H upward towards feeder tube 64. It should be understood that bowl 42 can be rotationally driven by any suitable means, such as be mechanical, electrical, hydraulic and magnetic means, or combinations thereof. Alternatively, bowl 42 may be manually rotated. In FIG. 2, bowl 42 has been shown as rotating in a clockwise direction. It should be understood that bowl 42 could rotate counterclockwise, if desired, after making modifications (such as the orientation of ramp 58) which would be obvious to one skilled in the art after reading this disclosure.

Applicator 12F, for example, is conveyed along ramp 58 along a rotational path as indicated in FIG. 2 by arrows 62, 66, 68, 70, 72. Ramp 58 is sufficiently long and sufficiently inclined so as to provide ample travel time for applicator 12F to become untangled from, e.g., applicator 12G, by the vibrations of bowl 42. Preferably, ramp 58 is about ninety to one-hundred inches long and rotates at about one hundred eighty to about two hundred twenty inches per minute and has a slope of about one to three degrees per inch (or about 1/34 to about 1/30 inches per inch). It should be understood that longer distances and times as well as steeper slopes or less inclined slopes could be used, however, depending on the desired travel time, the rate of vibrations, etc.

Figure 3:
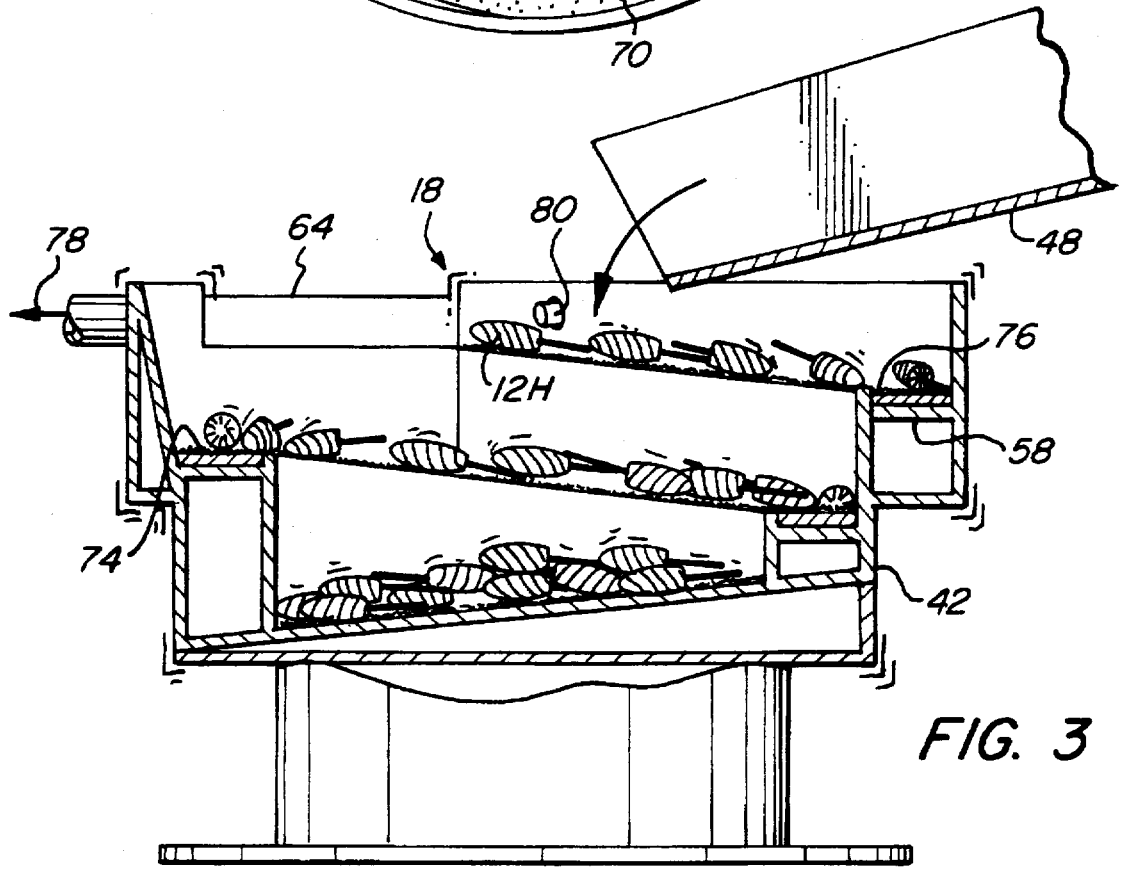
FIG. 3 is a cross-sectional of the spiraled ramp taken along line 3—3 of FIG. 2.

Referring to FIGS. 2, 3, at least some portions of upper surface 74 of ramp 58, and preferably the entire upper surface 74 of ramp 58, are covered with a high-friction material 76 so as to assist in transporting applicators 12F, 12G, 12H up ramp 58 and to assist in separating, for example, applicator 12F from applicator 12G. Preferably, the material has a sufficiently high coefficient of friction such that applicator 12F does not slide down ramp 58 while bowl 42 is vibrated.

It should be understood that the material used will depend upon a number of factors including: degree of slope of the ramp 58; the amount of surface area covered by the material 76; material finish; size and weight of applicators 12F, 12G, 12H; rate of vibrations of bowl 42; ramp 58 speed; and other factors. Any suitable material may be used so long as applicators 12F, for example, do not undesirably slide down ramp 58 while bowl 42 is vibrated. Preferably material marketed under the name DYNA SLIDE by Lipe-Rollway Automation Equipment, located in 7600 Morgan Road, Syracuse, N.Y. 13221 covers the upper portion 74 of ramp 58.

Advantageously, the fibers of material 76 are oriented in the desired direction of applicator 12F, 12G, 12H travel, indicated by arrows 62, 66, 68, 70, 72 in FIG. 2.

As shown in FIGS. 1–4, applicator 12H is transferred by transferring mechanism 18 from ramp 58 of bowl 42 into a feeder tube 64, in the direction of arrow 78. Transferring mechanism comprises air jet 80 (FIG. 1) and photo sensor 82 (FIG. 1). Air jet 80 is removably housed in inner wall 56 of bowl 42 and comprises a stream of compressed air from a source of compressed air which is commonly known in the art. Air jet 80 moves applicator 12I (FIG. 4) through tube 64. The stream of compressed air may be designed to be sufficient to transfer applicator 12I through tube 64 and towards storing mechanism 20, or, alternatively, it may be combined with one or more additional streams of compressed air (not shown).

Photo sensor 82 cooperates with, and is operably connected to, a second air jet (not shown) to regulate the movement of applicator 12H (FIGS. 2, 3) into feeder tube 64. For example, if photo sensor 82 detects that accumulator wheel 84 is full, and can hold no more applicators, photo sensor 82 activates the second air jet which sends a blast of air to applicator 12H blowing it off ramp 58 and onto floor 54 of bowl 42, where applicator 12H begins its assent up ramp 58 again. A second photo sensor (not shown) is operably connected to a timer (not shown) and will also activate the second air jet if the applicators are entangled at the wheel 84 entrance for more than one second.

Any suitable means can be used to sense whether accumulator wheel 84 can accept applicator 12H. Although a photo sensor has been described other suitable means include: laser sensors, optical sensors, and the like. In the preferred embodiment, the photo sensor used is that one made by Honeywell Division of Microswitch Corporation located in Newton, Mass. and having model number MICRO-MDFI or MICRO-MDVII.

Figure 4:
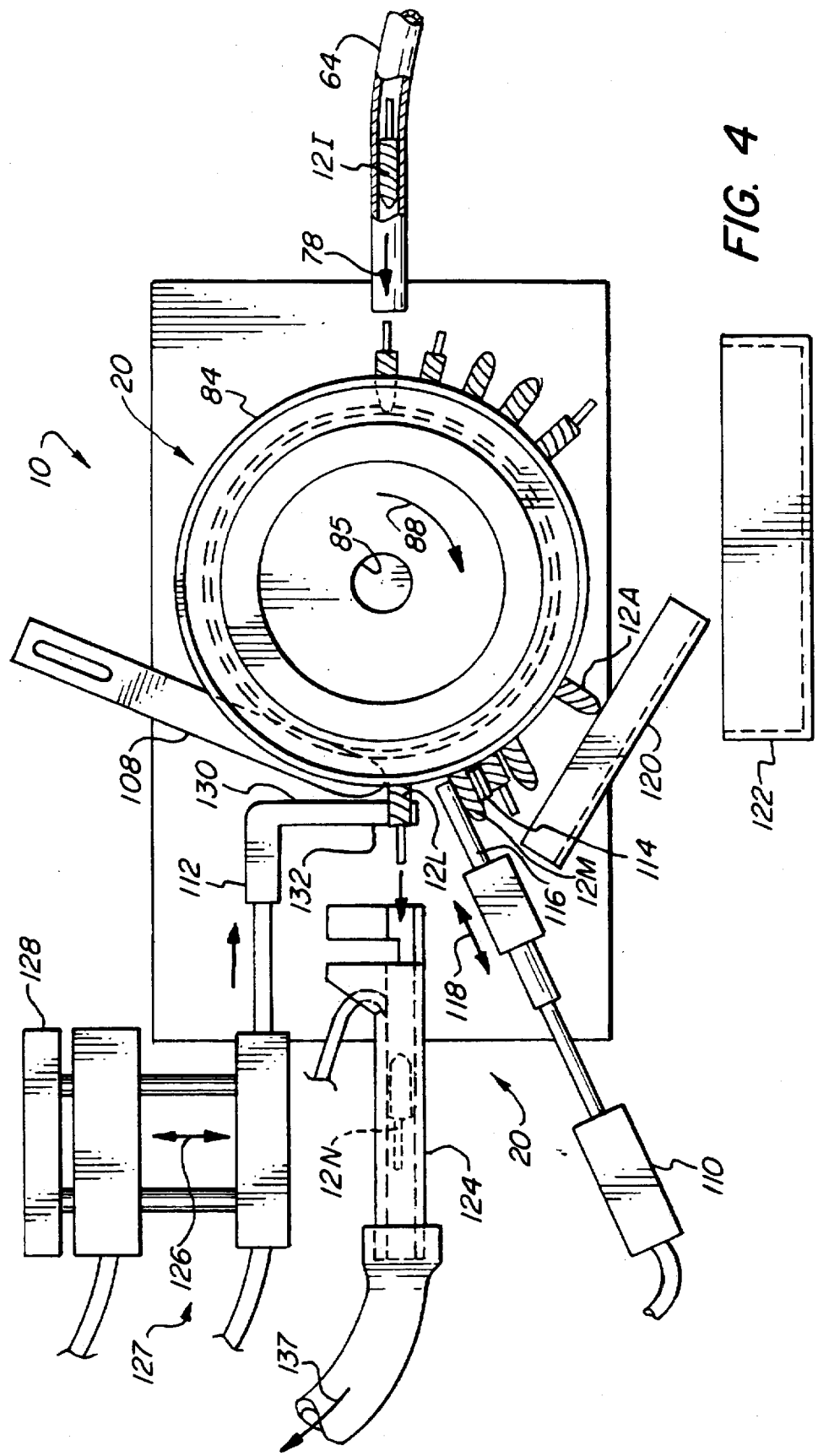
FIG. 4 is a schematic view of an accumulator wheel, shown in FIG. 1, showing a plurality of mascara applicators housed in the wheel irrespective of the applicator orientation and spaced at irregular intervals, and showing a mascara applicator housed in a tubing prior to entry into the wheel, the tubing in partial cross-section.

Transferring mechanism 18 (FIG. 1) moves applicator 12I from tube 64 to storing mechanism 20. As shown in FIG. 4, storing mechanism 20 comprises accumulator wheel 84 which rotates about central shaft 85 having a central axis along a rotational path as indicated by arrow 88 in FIG. 4, and which is positioned so as to receive in its slot 96 (FIG. 8) each applicator 12A, 12K, 12L, 12M as it exits feeder tube 64 in the direction shown by arrow 78 (see FIG. 4). Any suitable means can be used to rotate wheel 84, such as electrical, hydraulic, pneumatic and magnetic means, or a combination thereof. Preferably, wheel 84 is operably connected to a motor (not shown) which causes wheel 84 to rotate at a desired speed. Wheel 84 rotates about one revolution every six to fourteen seconds and preferably, rotates one revolution every ten to twelve seconds.

Although wheel 84 has been shown as located in a substantially vertical plane, it should be understood that wheel 84 could operate in a substantially horizontal plane, requiring modifications which would be obvious to those known in the art after reading this description. Further, accumulating device 84 need not be circular. Accumulator 84 could assume any shape so long as accumulator 84 properly receives and removably houses applicators, such as 12A, 12K, 12L, 12M.

Figure 5:
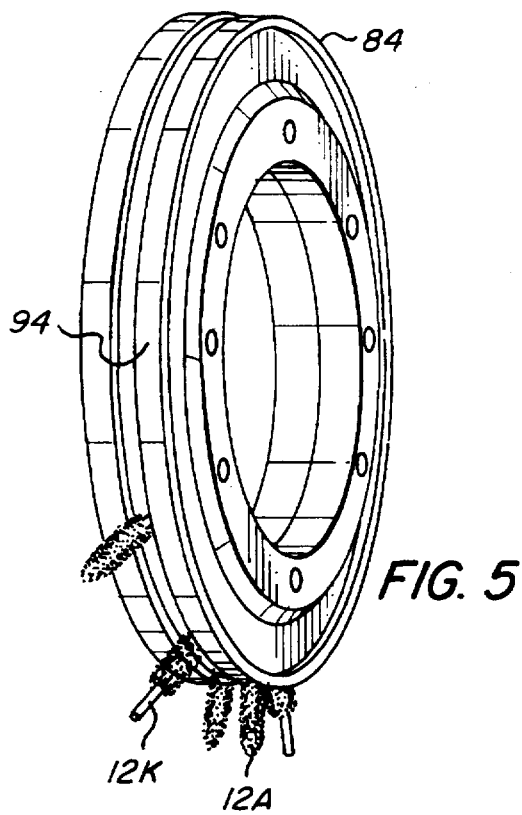
FIG. 5 is perspective view of the wheel shown in FIG. 4, showing a plurality of mascara applicators housed in the wheel.
Figure 6:
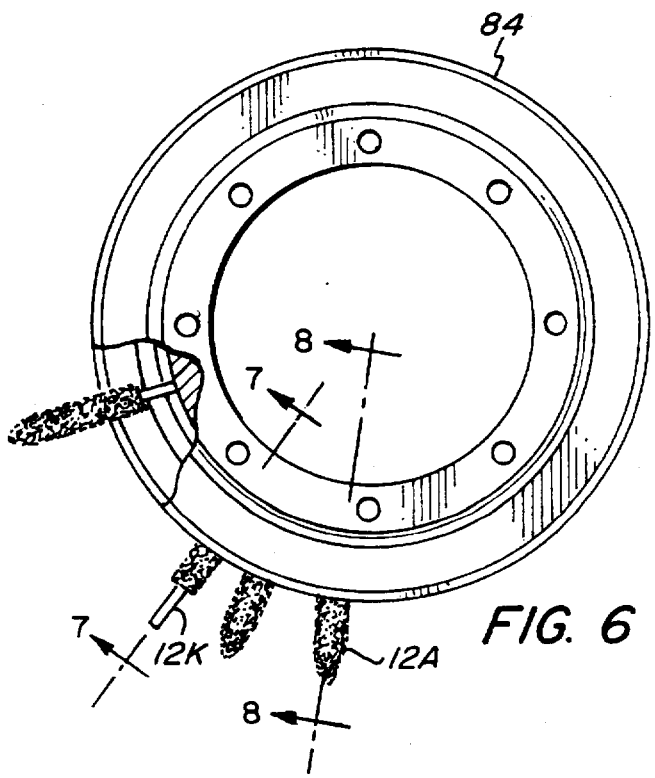
FIG. 6 is a front view of the wheel in partial cross-section with portions cut away to show an applicator.

Advantageously, wheel 84 accommodates a plurality of applicators 12A, 12K, 12L, 12M preferably up to about thirty applicators, depending on the applicator and wheel dimensions. Even more significantly, wheel 84 houses applicators 12A, 12K, 12L, 12M regardless of their orientation. That is, applicators can be housed in wheel 84 in either a brush-end first position (see applicator 12K in FIGS. 5–7) or a stem-end first position (see applicator 12A in FIGS. 5, 6, 8). Consequently, the difficult task of orienting the applicators 12A, 12K, 12L, 12M can be delayed and performed at a subsequent work station. Significantly, wheel 84 can house applicators 12A, 12K, 12L, 12M which are in either regular or irregularly spaced intervals. Consequently, the timing associated with loading wheel 84 of the present invention, due to sensitive applicator location, is less critical than required with prior art apparatus.

Figure 7:
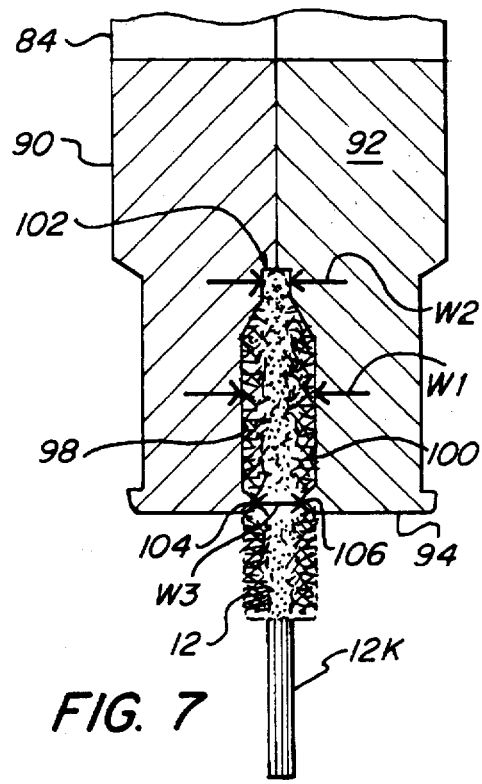
FIG. 7 is a cross-sectional view of a mascara applicator housed in the accumulator wheel, taken along line 7—7 of FIG. 6, the applicator disposed in a brush-end first position.

As shown in FIGS. 7, 8, wheel 84 comprises two sides 90, 92 and a circumferential edge 94 (FIG. 5) therebetween. A slot 96 (FIG. 8) having a first side 98 and a second side 100

(FIG. 7) is formed in circumferential edge 94, wherein slot 96 preferably has a width W1 (FIG. 7) approximately equal to the diameter 34 (FIG. 8) of brush 30 of applicator 12A. Most preferably slot 96 extends about the entire circumferential edge 94 of wheel 84. Advantageously, either the first end 26 or the second end 28 of applicator 12A, 12K, 12L, 12M can be removably housed in slot 96. Preferably, slot 96 tapers to form a stabilizing portion 102 which has a width W2 (FIG. 7) approximately equal to the diameter 36 of stem 32. Either a portion of stem 32 or a portion of brush 30 may be removably housed in stabilizing portion 102.

Wheel 84 can, for example, be formed of two substantially circular plates removably fixed together; it can be integrally molded or otherwise formed as a single unit. It could, however, be fabricated in any other suitable manner sufficient to form a circumferential edge.

Wheel 84 further comprises at least one, and preferably two, tabs 104, 106. Each tab 104, 106 is attached to or fabricated integrally with a side 98, 100 of slot 96 and extends inwardly from each side 98, 100 into slot 96. Most preferably, width W3 (FIG. 7) of slot 96 at the location of tabs 104, 106 is slightly less than the diameter 34 of the applicator 12A, 12K and slightly less than width W1 of slot 96.

Most preferably, width W3 of slot 96 at the location of tabs 104, 106 is about 0.160 inches to about 0.176 inches. Width W2 of slot 96 is about 0.01 inches to about 0.1 inches. Width W1 of slot 96 is about one-quarter inch to about one-third inch.

Slot 96 has a depth such that a portion of applicator 12A, 12K is engaged by tabs 104, 106 when applicator 12A, 12K is housed in slot 96, regardless of the orientation of the applicator 12A, 12K. That is, when the mascara applicator 12A is housed in slot 96 stem-end 28 first, then tabs 104, 106 engage brush 30 as shown in FIG. 8. Alternatively, when mascara applicator 12K is housed in slot 96 brush-end 26 first, as shown in FIG. 7, tabs 104, 106 still engage a portion of the brush section of applicator 12A, 12K. In both orientations, tabs 104, 106 serve to hold and stabilize applicator 12A, 12K in slot 96.

As shown in FIGS. 1, 4, removal mechanism 22 comprises stop member 108, blocker 110, separator 114 and picker 112. Stop member 108 stops the movement of applicator 12L at a predetermined location, preferably at a point substantially in the midplane of wheel 84. Member 108 may be moved to a retracted position (not shown) to allow a service technician to, for example, inspect wheel 84.

An operably connected and conventional air piston (not shown) drives blocker 110 and separator 114 which cooperate to separate applicator 12M from applicator 12L, so as to position applicator 12L for proper placement for removal by picking member 112. Blocker 110 comprises an extendable shaft 116 (FIG. 4) which is movable between a retracted position (not shown) and an extended position (FIGS. 1, 4), as indicated by arrow 118 in FIG. 4. In the retracted position, blocker 110 is positioned out-of-contact with all of mascara applicators 12A, 12K, 12L, 12M stored in accumulator wheel 84 and separator 114 is in an extended position, retaining applicators 12A, 12L for example. In the extended position, however, blocker 110 extends so as to prevent applicator 12M stored in accumulator wheel 84 from interfering with the picker's selection of applicator 12L, and separator 114 retracts allowing the next applicator to advance toward blocker 110.

Blocker 110 and separator 114 are operably connected to a conventional timing element (not shown) so that blocker 110 and separator 114 move between the retracted and extended positions once about every 0.5–1.0 seconds. The particular timing element used is not critical and is within the ordinary skill of the skilled artisan.

When blocker member 110 is in the retracted position and separator 114 is in an extended position (not shown), wheel 84 continues to rotate in the direction shown by arrow 88 (FIG. 4), causing applicator 12M, for example, to become properly positioned by stop member 108 for removal by picker 112.

Picker 112 is operably connected to conventional air pistons (not shown) movable between positions as discussed hereinbelow.

Picker 112 is operably connected to two conventional air pistons (not shown) and movable between a position near wheel 84 (FIG. 4), an over-position (not shown) adjacent to tube 124, and a retracted position (FIG. 1), wherein picker 112 is positioned slightly above transfer tube 124. Movement of picker 112 is dictated by ball slide 127 (FIG. 4) moveable in the directions indicated by arrow 126 stopping at a predetermined location indicated by stop member 128.

Picker 112 comprises gripper 130, which has at least one, and preferably two, movable fork-like members such as claw 132 (FIG. 4) and 133 (FIG. 1). Claws 132, 133 are movable via any suitable means, such as electric or hydraulic means, between an extended position (FIG. 4) and a retracted position (not shown). In the extended position, claws 132, 133 cooperate to retain applicator 12L therebetween with sufficient force so as to remove applicator 12L from wheel 84. In the retracted position (FIG. 1), claws 132, 133 are moved adjacent slot in transfer tube 124 and are operably opened so as to release applicator 12L from their grip.

Picker 112 and claws 132, 133 operate in substantially the following manner. Picker 112 begins, for example, in a retracted position (not shown), positioned substantially behind transfer tube 124. Claws 132, 133 are extended towards wheel 84 and grip applicator 12L. A conventional air piston (not shown), operably connected to picker 112, is activated by any suitable means causing applicator 12L to be removed from wheel 84 and transferred to transfer tube 124. Picker 112 then retracts, bringing gripper 130 and claws 132, 133 through the slot of transfer tube 124, and claws 132, 133 cooperate to release applicator 12L. The aforementioned air piston (not shown) then operates to cause picker 112 to extend toward wheel 84 and position picker 112 for another cycle substantially as described.

Applicator 12N in tube 124 is moved through the channel of tube 124 by blasts of air from a conventional compressed air machine (not shown) in the direction shown by arrow 137. See FIG. 4.

Tube 124 guides applicator 12N to orienting device 24, shown in FIG. 1. Advantageously, applicator 12N does not have to be oriented until this virtually final stage.

Orienting device 24 orients every applicator 12N which is not properly oriented when received by orienting device 24 and orients each applicator such as 12N so that it is brush-end down when applicator 12N exits orienting device 24. Applicator 12P is oriented for proper placement into a mascara insert 134, for example. Inserts 134 containing mascara are removably housed in regularly spaced apart holes on assembly table 136. Assembly table 136, operably connected to a motor (not shown) rotates at a predetermined speed in the direction shown by arrow 138.

As shown in FIGS. 1, 9–11, orienting machine 24 orients the applicators, such as 12Q, 12R. Orienting device 24 comprises housing 159 (FIG. 11) for housing shuttle 160 movable in the direction shown by arrows between a first position for receiving applicators 12Q, 12R (FIGS. 12, 15) and a second position for disposing of applicators 12Q, 12R (FIG. 13). Shuttle 160 has receiving slot 161 at one end thereof having a size and shape suitable to receive an applicator either stem-end first (see applicator 12Q in FIG. 12) or brush-end first (see applicator 12R in FIG. 15) and main compartment or main slot 162 for temporarily storing the applicators. Shuttle 160 further comprises stem slot 164 at the end opposite receiving slot 161, having a size and shape and size sufficient to receive only the stem 32Q of applicator 12Q, for example (FIG. 12); the width of slot 164 is smaller than the width of slot 162.

Shuttle 160 further comprises recessed areas 166, 168 having a width sufficient to allow the passage of the stems 32Q, 32R. For example, recessed area 166 is sufficient to allow the passage of the stem 32Q when applicator 12Q is positioned stem-end first (FIG. 12), while recessed area 168 is sufficient to allow the passage of the stem 32R when applicator 12R is positioned brush-end first (FIG.15).

In operation, applicator 12Q, 12R passes through transfer tube 124 (FIGS. 10–15) and is positioned in slot 162 of shuttle 160. Shuttle 160 is designed so as to suitably receive applicators which enter in either stem-end first (FIG. 12) or brush-end first (FIG. 15).

As shown in FIGS. 12–14, applicator 12Q which enters stem-end first is guided by tapered guide members 165, 167 and is positioned such that stem 32Q is received in stem slot 164 and movable in recessed area 166. Shuttle 160 moves in the direction shown by arrow 169 to a second position shown in FIG. 13. In this second position, brush-end 30Q of applicator 12Q is positioned over channel 170 of transfer tube 172 (FIGS. 10, 14). Applicator 12Q falls through tube 172 brush-end first and into mascara insert 134, for example, on rotating table 136 (FIGS. 1, 9–10).

As shown in FIGS. 15–16, applicator 12R which enters brush-end first is positioned such that brush 30R is received in slot 162 and stem 32R is movable in recessed area 168. Members 165, 167 act as stop members to properly position applicator 12R. Shuttle then moves to a second position (FIG. 13), such that brush-end is positioned over channel 170 of transfer tube 172. Applicator 12R falls through tube 172 brush-end first and into mascara insert such as 134 on rotating table 136 (FIGS. 1, 9–10).

After applicator 12P is properly inserted into insert 134, assembly table 136 rotates so as to properly position the next mascara insert under orienting device 24. A floor operator (not shown) routinely removes assembled mascara inserts 134 and collects the assembled products for transport to another work station, such as a packaging work station (not shown).

Chute 120, located below accumulator wheel 84, catches applicators which are not properly engaged and which may fall from wheel 84 before they are removed from wheel 84 by picking member 112. Fallen applicators travel down chute 120 and are removably housed in bin 122. See FIGS. 1, 4. Applicators retrieved from bin 122 may be refed into bowl 42 by a floor operator (not shown).

A method for transferring, separating, sorting, storing and orienting mascara applicators in accordance with the present invention generally follows the operation of apparatus 10 discussed above and comprises the steps of: feeding a plurality of articles, such as mascara applicators 12B, 12C, 12D, 12E into bowl 42; rotating bowl 42 about a rotational path indicated by arrows 62, 66, 68, 70, 72; vibrating bowl 42 so as to vibrate each applicator 12F, 12G, for example, in bowl 42 onto ramp 58 and to facilitate separating one applicator 12F from another 12G; rotating accumulator wheel 84 about a central axis; transferring at least one applicator 12H from bowl 42 to accumulator wheel 84; storing a plurality of applicators 12A, 12K, 12L, 12M regardless of the orientation of the applicators; and rotating the accumulator wheel 84 so that applicators 12A, 12K, 12K, 12L (FIG. 6) rotate in slot 96 along with accumulator wheel 84. Additional steps include: accumulating a plurality of applicators 12A, 12K, 12L, 12M in slot 96 of accumulator wheel 84 at regularly or irregularly spaced intervals; and orienting the applicators 12Q, 12R for proper placement in a mascara insert 134.

The present invention, therefore, provides a new and useful apparatus and method for transferring nonoriented mascara applicators.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A method for transferring articles, comprising the following steps:

feeding a plurality of articles into a bowl, the bowl having a top, a bottom, and an inner wall extending therebetween, each article having a first end and a second end;

rotating the bowl about a rotational path;

vibrating the bowl so as to facilitate separating one article from another;

rotating an accumulator device about an axis, the device comprising two sides and an edge formed about the perimeter of the sides, and a slot formed in the edge, wherein either the first end or the second end of the article can be removably housed in the slot; and transferring at least one article from the bowl to the accumulator device, regardless of the orientation of the article, so that the article rotates in the slot along with the accumulator device.

2. The method for transferring articles of claim 1, further comprising the step of accumulating a plurality of articles in the slot of the accumulator device at regularly or irregularly spaced intervals.

3. The method for transferring articles of claim 1, further comprising the step of vibrating each article in the bowl onto a ramp, the ramp being spirally positioned along the inner wall of the bowl and positioned so as to move each article from the bottom of the bowl to the top of the bowl.

4. The method for transferring articles of claim 3, further comprising the step of applying a layer of material on an upper surface of the ramp so as to facilitate transporting the article along the ramp, the material having a sufficiently high coefficient of friction such that the article does not slide down the ramp.

5. The method for transferring articles of claim 1, further comprising the step of positioning a stop member at a point along the rotational path of the accumulator device such that an article can not travel beyond the stop member.

6. An accumulator wheel for receiving at least one article, the article having a first end and a second end, the first end comprising a brush having a predetermined diameter, and the second end comprising a stem having a predetermined diameter less than the diameter of brush, the wheel comprising:

two sides and a circumferential edge therebetween and a slot formed in the circumferential edge, the slot having a first side and a second side and a width therebetween, the width being approximately the diameter of the brush, wherein either the first end or the second end of the article can be removably housed in the slot of the wheel; and at least one tab attached to one side of the slot and extending inwardly into the slot, wherein the width of the slot at the location of the tab is less than the diameter of the brush.

7. The accumulator wheel for receiving at least one article of claim 6, wherein the slot tapers to form a stabilizing portion which has a width approximately the diameter of the stem, wherein either a portion of the stem or a portion of the brush can be removably housed in the stabilizing portion.

8. The accumulator wheel for receiving at least one article of claim 6, the wheel further comprising at least two tabs, one tab being positioned on each side of the slot, wherein each tab extends inwardly into the slot.

9. The accumulator wheel for receiving at least one article of claim 6, the slot having a depth such that a portion of the brush is engaged by the tab when the article is housed in the slot, regardless of the orientation of the article.

10. The accumulator wheel for receiving at least one article of claim 6, the wheel comprising two plates removably attached so as to form a circumferential edge therebetween.

11. The accumulator wheel for receiving at least one article of claim 10, wherein the plates are substantially circular.

12. The accumulator wheel for receiving at least one article of claim 6, the slot extending about the entire circumferential edge of the wheel.

13. The accumulator wheel for receiving at least one article of claim 6, the slot having a size and a shape sufficient to simultaneously house a plurality of articles.

14. The accumulator wheel for receiving at least one article of claim 6, wherein the article comprises a mascara applicator.

15. An apparatus for receiving and transferring at least one article, comprising:

a bowl for receiving a plurality of articles, the bowl having a top and a bottom and an inner wall extending therebetween, and a ramp spirally positioned along the inner wall of the bowl;

a layer of material on an upper surface of the ramp to facilitate transporting the article such that the article does not slide down the ramp, the material comprising DYNA SLIDE material;

means for rotating the bowl about a rotational path;

means for vibrating the bowl;

wherein the bowl is rotated and vibrated so as to transport each article along the ramp from substantially the bottom of the bowl to substantially the top of the bowl.

16. A machine for transferring mascara applicators, each mascara applicator having a first end and a second end, the first end comprising a brush having a predetermined diameter, and the second end comprising a stem, the stem having a diameter less than the diameter of the brush, the machine comprising:

a bowl for receiving a plurality of mascara applicators, the bowl having a top and a bottom and an inner wall extending therebetween, and a spiraled ramp positioned along the inner wall of the bowl so as to transport at least one mascara applicator along the ramp from substantially the bottom of the bowl to substantially the top of the bowl;

means for rotating the bowl about a rotational path;

means for vibrating the bowl; and an accumulator wheel comprising:
two sides and a circumferential edge therebetween and a slot formed in the circumferential edge, the slot having a first and a second side and a width therebetween, the width being approximately equal to the diameter of the brush, wherein either the first end or the second end of the mascara applicator can be removably housed in the slot of the wheel; and at least one tab attached to a side of the slot and extending inwardly into the slot, wherein the width of the slot at the location of the tab is less than the diameter of the brush.

17. The machine for transferring mascara applicators of claim 16, wherein the slot of the wheel tapers to form a stabilizing portion which has a diameter approximately the diameter of the stem, wherein a portion of the stem or a portion of the brush can be removably housed in the stabilizing portion.

18. The machine for transferring mascara applicators of claim 16, the wheel further comprising at least two tabs, wherein each tab is attached to one side of the slot and extends inwardly into the slot.

19. The machine for transferring mascara applicators of claim 16, wherein the slot has a depth such that a portion of the brush is engaged by the tab when the applicator is housed in the slot, regardless of the orientation of the applicator.

* * * * *